(12) United States Patent
Jagger et al.

(10) Patent No.: US 6,641,644 B2  
(45) Date of Patent: Nov. 4, 2003

(54) PRESSURE SWING ADSORPTION GAS SEPARATION METHOD AND APPARATUS

(75) Inventors: Theodore W. Jagger, White Bear Lake, MN (US); Alexander E. Van Brunt, White Bear Lake, MN (US); Nicholas P. Van Brunt, White Bear Lake, MN (US)

(73) Assignee: VBOX, Incorporated, White Bear Lake, MN (US)

( * ) Notice: Subject to any disclaimer, the term of this patent is extended or adjusted under 35 U.S.C. 154(b) by 0 days.

(21) Appl. No.: 10/244,240

(22) Filed: Sep. 16, 2002

(65) Prior Publication Data

US 2003/0010208 A1 Jan. 16, 2003

Related U.S. Application Data

(63) Continuation of application No. 10/044,791, filed on Jan. 10, 2002, now Pat. No. 6,511,526.
(60) Provisional application No. 60/261,630, filed on Jan. 12, 2001.

(51) Int. Cl.[7] ............................................. B01D 53/047
(52) U.S. Cl. ............................. 95/96; 95/103; 95/130; 96/108; 96/115; 96/143
(58) Field of Search ................... 95/96–98, 100–105, 95/130; 96/108, 115, 130, 143, 144

(56) References Cited

U.S. PATENT DOCUMENTS 3,121,625 A 2/1964 Broughton ..................... 55/58
3,236,028 A * 2/1966 Rutan ............................. 95/98

(List continued on next page.)

FOREIGN PATENT DOCUMENTS

| EP | 0 368 649 | 5/1990 | ........... B01D/53/04 |
| GB | 2 174 922 A | 11/1986 | ........... B01D/53/04 |
| WO | WO 98/55207 | 12/1998 | ......... B01D/53/053 |
| WO | WO 98/57727 | 12/1998 | ......... B01D/53/047 |
| WO | WO 99/43416 | 9/1999 | |
| WO | WO 99/43418 | 9/1999 | |

OTHER PUBLICATIONS

Peter L. Bliss, Robert W. McCoy, and Alexander B. Adams, A Bench Study Comparison of Demand Oxygen Delivery Systems and Continuous Flow Oxygen, pp. 925–931, Respiratory Care, Aug. 1999, vol. 44 No. 8.

*Primary Examiner*—Robert H. Spitzer  
(74) *Attorney, Agent, or Firm*—Kinney & Lange, P.A.

(57) ABSTRACT

The present invention is a gas separator for separating a gas mixture into a product gas. The gas separator has an adsorbent bed including a separation chamber with first and second ports and a molecular sieve material contained in the separation chamber. A first pumping chamber is connected to the first port. A first valve regulates a flow of the gas mixture between the first port and the first pumping chamber. A first piston is located in the first pumping chamber. A second pumping chamber is connected to the second port. A second valve regulates a flow of the product gas between the second port and the second pumping chamber. A second piston is located in the second pumping chamber. A drive system coordinates operation of the first and second pistons and the first and second valves in a cycle including a pressurization stage, a gas shift stage, and a depressurization stage.

22 Claims, 4 Drawing Sheets

U.S. PATENT DOCUMENTS

| | | | | |
|---|---|---|---|---|
| 3,880,616 A | | 4/1975 | Myers et al. | 55/62 |
| 3,922,149 A | * | 11/1975 | Ruder et al. | 95/22 |
| 4,169,715 A | * | 10/1979 | Eriksson | 96/114 |
| 4,354,859 A | | 10/1982 | Keller, II et al. | 55/25 |
| 4,386,945 A | | 6/1983 | Gardner | 55/26 |
| 4,448,592 A | | 5/1984 | Linde | 55/68 |
| 4,449,990 A | | 5/1984 | Tedford, Jr. | 55/26 |
| 4,576,616 A | * | 3/1986 | Mottram et al. | 95/96 |
| 4,627,860 A | | 12/1986 | Rowland | 55/162 |
| 4,673,415 A | * | 6/1987 | Stanford | 95/19 |
| 4,684,377 A | * | 8/1987 | Haruna et al. | 95/102 |
| 4,702,903 A | * | 10/1987 | Keefer | 423/359 |
| 4,801,308 A | | 1/1989 | Keefer | 55/25 |
| 4,816,121 A | | 3/1989 | Keefer | 204/156 |
| 4,826,510 A | | 5/1989 | McCombs | 95/96 |
| 4,880,443 A | | 11/1989 | Miller et al. | 55/26 |
| 4,948,401 A | | 8/1990 | Izumi et al. | 55/180 |
| 4,968,329 A | | 11/1990 | Keefer | 55/25 |
| 4,971,609 A | | 11/1990 | Pawlos | 55/162 |
| 5,002,591 A | * | 3/1991 | Stanford | 95/98 |
| 5,034,023 A | | 7/1991 | Thompson | 55/2 |
| 5,069,688 A | | 12/1991 | Wells | 55/25 |
| 5,071,449 A | | 12/1991 | Sircar | 55/26 |
| 5,082,473 A | | 1/1992 | Keefer | 55/25 |
| 5,096,469 A | | 3/1992 | Keefer | 55/25 |
| 5,186,793 A | | 2/1993 | Michaels | 204/59 |
| 5,228,840 A | | 7/1993 | Swank | 417/211 |
| 5,256,172 A | | 10/1993 | Keefer | 423/230 |
| 5,340,381 A | * | 8/1994 | Vorih | 95/21 |
| 5,415,683 A | | 5/1995 | Leavitt | 95/101 |
| 5,469,372 A | | 11/1995 | McBrearty et al. | 364/550 |
| 5,474,595 A | * | 12/1995 | McCombs | 95/23 |
| 5,487,775 A | * | 1/1996 | LaCava et al. | 95/98 |
| 5,531,807 A | | 7/1996 | McCombs | 55/26 |
| 5,711,787 A | * | 1/1998 | Neill et al. | 95/96 |
| 5,730,778 A | * | 3/1998 | Hill et al. | 95/12 |
| 5,746,806 A | * | 5/1998 | Aylsworth et al. | 95/8 |
| 5,827,358 A | | 10/1998 | Kulish et al. | 96/115 |
| 5,858,063 A | * | 1/1999 | Cao et al. | 95/11 |
| 5,871,564 A | * | 2/1999 | McCombs | 95/98 |
| 5,893,275 A | | 4/1999 | Henry | 62/615 |
| 5,893,944 A | | 4/1999 | Dong | 96/114 |
| 5,906,672 A | | 5/1999 | Michaels et al. | 95/12 |
| 5,917,135 A | | 6/1999 | Michaels et al. | 95/11 |
| 5,928,189 A | | 7/1999 | Phillips et al. | 604/65 |
| 5,931,159 A | | 8/1999 | Suzuki et al. | 128/204.18 |
| 5,948,142 A | | 9/1999 | Holmes et al. | 95/99 |
| 5,968,236 A | | 10/1999 | Bassine | 96/130 |
| 5,979,440 A | | 11/1999 | Honkonen et al. | 128/201.21 |
| 5,985,001 A | | 11/1999 | Garrett et al. | 95/29 |
| 5,985,113 A | | 11/1999 | Crome et al. | 204/286 |
| 5,988,165 A | | 11/1999 | Richey, II et al. | 128/205.12 |
| 5,997,617 A | | 12/1999 | Czabala et al. | 96/130 |
| 6,010,555 A | * | 1/2000 | Smolarek et al. | 95/98 |
| 6,017,315 A | | 1/2000 | Starr et al. | 600/538 |
| 6,033,457 A | | 3/2000 | Lawless | 95/4 |
| 6,051,050 A | | 4/2000 | Keefer et al. | 95/96 |
| 6,056,804 A | | 5/2000 | Keefer et al. | 95/96 |
| 6,068,680 A | | 5/2000 | Kulish et al. | 95/98 |
| 6,077,331 A | * | 6/2000 | Phillips | 95/12 |
| 6,143,056 A | * | 11/2000 | Smolarek et al. | 95/96 |
| 6,156,100 A | * | 12/2000 | Conrad et al. | 95/98 |
| 6,168,422 B1 | | 1/2001 | Motyka et al. | 431/202 |
| 6,176,897 B1 | | 1/2001 | Keefer | 95/98 |
| 6,217,635 B1 | * | 4/2001 | Conrad et al. | 95/97 |
| 6,290,759 B1 | | 9/2001 | Fenner et al. | 96/130 |
| 6,302,107 B1 | | 10/2001 | Richey, II et al. | 128/205.18 |
| 6,342,090 B1 | * | 1/2002 | Cao | 95/23 |
| 6,346,139 B1 | * | 2/2002 | Czabala | 95/130 |
| 6,511,526 B2 | * | 1/2003 | Jagger et al. | 95/96 |

\* cited by examiner

| ACTION | 52 | 20 | 18 | 42 | PRESSURE |
|---|---|---|---|---|---|
| PRESSURIZE | PUSH | OPEN | CLOSED | PUSH (LAG) | LOW TO HIGH |
| GAS SHIFT | RETRACT | OPEN | OPEN | PUSH | HIGH TO HIGH |
| DE-PRESSURIZE | RETRACT | CLOSED | OPEN | RETRACT | HIGH TO LOW |

FIG. 3

PRESSURE SWING ADSORPTION GAS SEPARATION METHOD AND APPARATUS

CROSS-REFERENCE TO RELATED APPLICATION(S)

This application is a continuation of U.S. patent application Ser. No. 10/044,791, filed on Jan. 10, 2002, now U.S. Pat. No. 6,511,526, issued Jun. 28, 2003 which claims benefit of Provisional Application No. 60/261,630, filed on Jan. 12, 2001, both applications in the names of Theodore W. Jagger, Alexander E. Van Brunt and Nicholas P. Van Brunt.

BACKGROUND OF THE INVENTION

The present invention relates to the separation of a selected gas from a mixture of gases by pressure swing adsorption. The primary goal is to maximize the ratio of selected gas volume to energy input while minimizing the ratio of mechanical volume of the separator to the selected gas volume. The present invention separates, from the gas mixture, a concentration of one or more components of a gas mixture for delivery or storage.

Pressure swing adsorption (PSA) is a frequently used method to separate one component of a gas mixture. For example, pressure swing adsorption is used to separate concentrated oxygen from air and then deliver it to a patient for medical purposes. A common use in home medical care is the delivery of 90–95% concentrated oxygen, derived from the atmosphere, at rates up to 6 liters per minute for the treatment of emphysema or other diseases of the lungs in the home. The machines used for this purpose are large, bulky, heavy, and require a large amount of power to operate, thus making battery power impractical. Patients must have a supply of bottled oxygen available when they leave their home because use of an oxygen concentrator outside the home is not convenient or practical. Use of bottled oxygen is undesirable because of its disadvantages: limited operating capacity, heavy weight and hazardousness.

PSA is widely used in industrial gas separation processes as well. Industrial PSA processes vary in the type of gas mixture used and selected gas separated.

Generally PSA involves injecting a mixture of gas into a gas separation chamber having an adsorbent bed or molecular sieve bed. One gas is readily adsorbed when pressurized above atmospheric pressure in the adsorbent bed, while the other gas is less adsorbed. Both of the separated gases may be utilized or one may preferentially be used while the other is vented as waste. The adsorbed gas in the adsorbent bed is released upon lowering the gas separation chamber to the original atmospheric pressure, at such time purging the adsorbent bed. In order to achieve sufficient concentration of the separated gas, two or more adsorbent beds are used in either sequential or multi-processing modes. It is common to purge the bed of the adsorbed gas by using a portion of the product gas in order to improve the efficiency of the process.

The selected gas in the mixture can be either adsorbed with the remaining mixture, vented to atmosphere, or otherwise removed. Alternatively, the undesirable components may be adsorbed leaving the selected gas to be passed on for storage or immediate use. The adsorbed component is then discharged as a waste gas, stored or utilized immediately dependant upon the application.

To further clarify, the following is a description of a typical continuous process.

(1) Feed gas mixture (A+B) into a container with an adsorbent bed, at some pressure above atmosphere until the bed is saturated.

(2) Gas B must be adsorbed and stopped before it exits the product end. Gas A is moved to temporary or permanent storage from the product end.

(3) Reduce pressure on adsorbent bed.

(4) Extract gas B from the feed end while taking a fraction of gas A and feeding it back into the product end to purge gas B.

(5) Stop feeding gas A into the product end before it exits from the feed end.

(6) Return to step 1.

An example of this process is disclosed in U.S. Pat. No. 5,415,683 entitled "VACUUM PRESSURE SWING ADSORPTION PROCESS".

Methods of providing portability, as disclosed in U.S. Pat. No. 4,971,609 entitled "PORTABLE OXYGEN CONCENTRATOR" and U.S. Pat. No. 4,826,510 entitled "PORTABLE LOW PROFILE DC OXYGEN CONCENTRATOR", attempt to reduce the physical packaging design and provide on-demand flow, thereby improving efficiency and portability. These designs are severely limited because they do not improve the inherent low efficiency of the PSA process. The prior art requires an amount of energy impractical for sustained battery operation, a small compact size and lightweight apparatus, while still producing the necessary flow rate and product gas concentration. Inefficiencies arise in the PSA process from the following sources: (a) resistance to gas flow through the adsorbent bed, (b) energy losses in the pressurization/depressurization process, (c) irreversible thermal losses, and (d) inefficiencies in compressors, gas pumps and valves. Negating these inefficiencies while maintaining the desired flow rate and concentration is required in order to achieve a smaller, lightweight overall machine package capable of battery operation.

BRIEF SUMMARY OF THE INVENTION

The present invention is a gas separator device using pressure swing adsorption to separate from a gas mixture the concentration of one or more components of that mixture.

The present invention is a gas separator for separating a gas mixture into a product gas. The gas separator has an adsorbent bed including a separation chamber with first and second ports and a molecular sieve material contained in the separation chamber. A first pumping chamber is connected to the first port. A first valve regulates a flow of the gas mixture between the first port and the first pumping chamber. A first piston is located in the first pumping chamber. A second pumping chamber is connected to the second port. A second valve regulates a flow of the product gas between the second port and the second pumping chamber. A second piston is located in the second pumping chamber. A drive system coordinates operation of the first and second pistons and the first and second valves in a cycle including a pressurization stage, a gas shift stage, and a depressurization stage.

BRIEF DESCRIPTION OF THE DRAWINGS

FIG. 3 is a table summarizing the functional stages of the gas separator of the present invention.

DESCRIPTION OF THE PREFERRED EMBODIMENT

Figure 1:
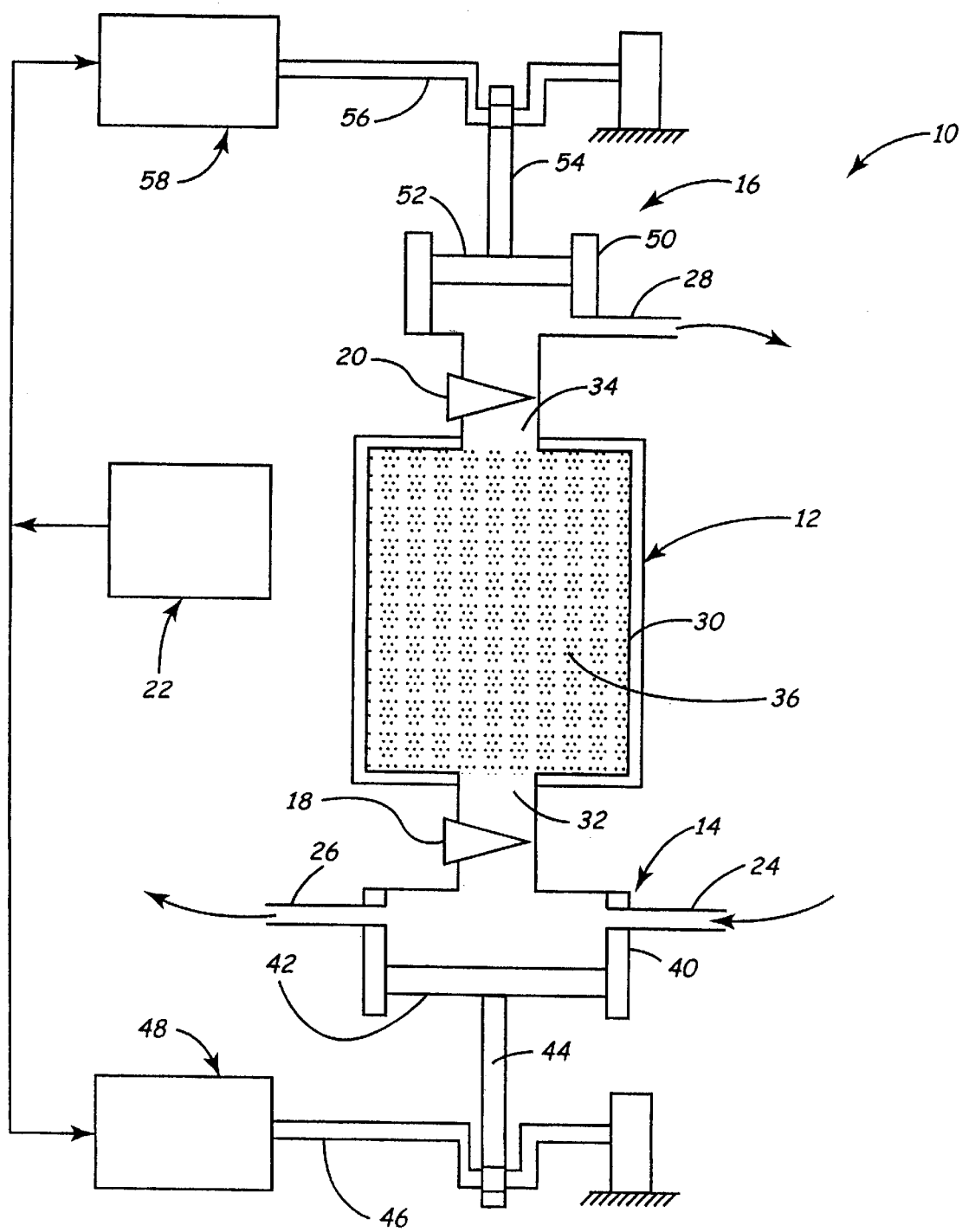
FIG. 1 is a diagram of a pressure swing gas separator of the present invention.

FIG. 1 is a diagram of pressure swing gas separator 10 of the present invention for separating from a gas mixture the concentration of one or more components of that mixture (product gas). Separator 10 includes adsorbent bed 12, first pump 14, second pump 16, first valve 18, second valve 20, controller/energy source 22, a gas mixture inlet 24, first outlet 26 and second outlet 28. A gas mixture enters gas separator 10 through inlet 24. Waste gas, the gas mixture minus the product gas, exits gas separator 10 at first outlet 26 (feed end). The product gas exits gas separator 10 from second outlet 28 (product end).

Adsorbent bed 12 includes separation chamber 30, which has first port 32 and second port 34. A molecular sieve material 36 is contained within separation chamber 30, such as an adsorbent pressure swing preferential material (e.g. zeolite).

First pump 14 includes pumping chamber 40, first piston 42, piston rod 44, crank shaft 46, and first drive motor 48. Pumping chamber 40 is connected to first inlet 24, first outlet 26 and to first port 32 of adsorbent bed 12.

Second pump 16 includes second pumping chamber 50, second piston 52, second piston rod 54, second crank shaft 56 and second drive motor 58. Second pumping chamber 50 is connected to second outlet 28 and to second port 34 of adsorbent bed 12.

First valve 18 controls gas flow between first pumping chamber 40 and first port 32 of adsorbent bed 12. Second valve 20 controls gas flow between second pumping chamber 50 and second port 34 of adsorbent bed 12. Controller/ energy source 22 operates as a drive system to control operation of first and second drive motors 48 and 58 (thereby first and second pistons 42 and 52) and first and second valves 18 and 20.

The preferred embodiment of the gas separator 10 requires a complex timing sequence of valve opening and closure, piston movement relative to one another and the valves, and the sizing of the pistons (volumetric displacement). All these interactive variables are required for each product gas.

Figure 2:
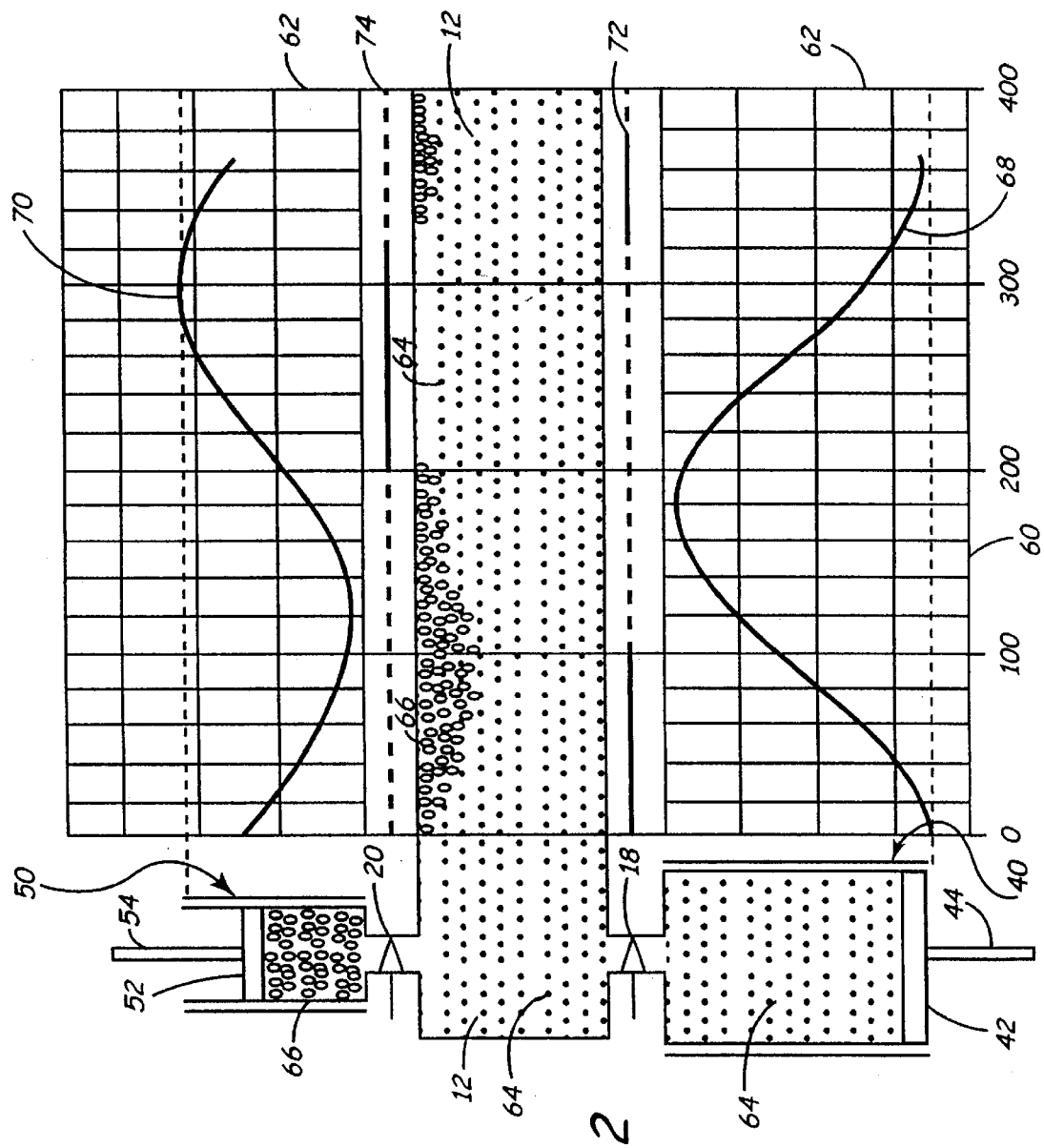
FIG. 2 is a graph demonstrating the relative timing of pistons, valves and gas separation of the present invention, during a pressure swing cycle.

FIG. 2 is a graph demonstrating the relative timing of pistons, valves and gas separation in the present invention during a pressure swing cycle (and includes a portion of the structure shown in FIG. 1). Axis 60 of the graph in FIG. 2 shows degrees/unit of the time and axis 62 shows piston displacement. Adsorbent bed 12, including gas mixture 64 and product gas 66 ratios during the pressure swing cycle, is shown longitudinally along the middle of the graph. The heavy lined sinusoidal waveforms 68 and 70 show the path of piston displacement for first and second pistons 42 and 52, respectively. The actual optimized waveform would not necessarily be an exact sinusoid, but for clarity this is used in the drawing. Lines 72 and 74 are used to show the opening and closing of first and second valves 18 and 20, respectively. The dark horizontal solid lines are used to indicate the closing of the valves while the dashed lines indicate the opening of the valves.

Adsorbent bed 12 is shown elongated along the graph to illustrate what happens to gas mixture and pistons 42 and 52 go through their displacement cycle. Note in particular the concentration of the product gas in the bed as it relates to the timing of the piston displacement cycle. In this illustration the concentration of the product gas in the bed increases during the pressurization stage, from 0 degrees to about 110 degrees. At 110 degrees, the gas shift stage is underway with first valve 18 open and first piston 42 moving upward. The pressure in the adsorbent bed is pushing second piston 52 upward during this time helping to pull the product gas out of the adsorbent bed and recover the potential energy of the compressed gas. When second valve 20 closes, the depressurization stage and waste gas removal begins. First piston 42 moves downward depressurizing the bed, thereby removing the waste gas from the bed and preparing for the entry of a new gas mixture. To separate different gases at the required volumetric flow requires new parameters to be selected for volumetric displacement, valve timing and piston cycles relative to one another.

FIG. 3 is a table summarizing the functional stages of the gas separator. The stages include a pressurization stage, a gas shift stage and a depressurization stage. A significant difference in this invention from prior art gas separators is the minimization of energy loss at every stage in order to maximize the ratio of product gas volume produced to energy used.

As seen in FIG. 2 and described by FIG. 3, during the pressurization stage, a gas mixture is pressurized by product gas being compressed downward into adsorbent bed 12 by downward movement of second piston 52 and second valve 20 being open. Meanwhile first valve 18 is closed and upward movement of first piston 42 compresses the gas mixture and increases pressure of the gas mixture on first valve 18.

During the gas (volume) shift stage, when the gas mixture pressure equals the pressure in adsorbent bed 12, first valve 18 is opened. Because the pressure is the same on both sides of first valve 18, no energy is expended in the gas flow past first valve 18. After first valve 18 is opened, the shift of the gas mixture volume occurs upward through adsorbent bed 12. The product gas moves upward, pushing second piston 52 upward and thus recovering much of the energy stored by the previous movement of second piston 52 downward. At the same time as the gas mixture moves upward, the gas which is selectively adsorbed will be removed from the gas mixture leaving product gas which adds to the product gas already injected in the previous pressurization stage.

There is a critical step in the timing of the stages just before the gas mixture saturates adsorbent bed 12. At this point, second valve 20 is closed and first valve 18 remains open. If this is not done, part of the gas mixture will enter with the product gas into second chamber 50, reducing the concentration of product gas. During the gas shift stage, second piston 52 has been retracting, aiding in the gas shift and withdrawing product gas. The closure of second valve 20 does not result in an energy loss, as the pressure differential across it is zero. After second valve 20 closes, some product gas can be withdrawn through second outlet 28 for use or storage.

During the depressurization stage, adsorbent bed 12 is regenerated. First piston 42 retracts and the pressure in adsorbent bed 12 falls. The remaining waste gas (gas mixture minus product gas) from the gas mixture is exhausted out of first outlet 26. The pressure swing cycle then begins again with a new pressurization stage.

Figure 4:
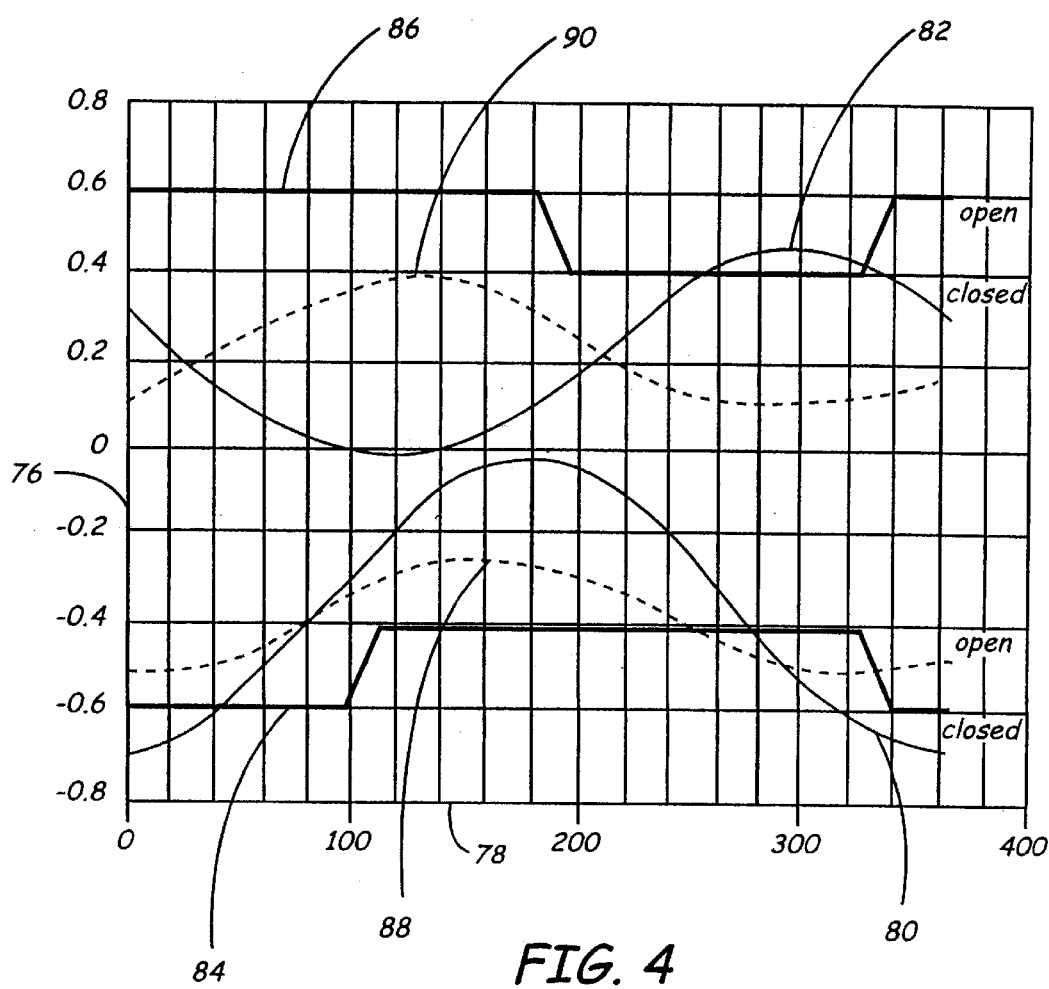
FIG. 4 is a graph demonstrating the relative timing of piston displacement, valve opening and closure, and pressure relative to each piston during the pressure swing cycle.

FIG. 4 is a graph demonstrating the relative timing of gas separator 10. In particular, the graph shows piston displacement, valve opening and closing, and pressure relative to each piston during the pressure swing cycle. This graph shows displacement of pistons 42 and 52 (axis 76)

versus the rotation of crankshafts 46 and 56 (axis 78), in inches and degrees respectively. FIG. 4 is similar to FIG. 2, with the addition of showing the gas pressure found in pumping chambers 40 and 50. Lines 80 and 82 show the displacement of first and second pistons 42 and 52 respectively. Lines 84 and 86 show the closure and opening of first and second valves 18 and 20 respectively. Lines 88 and 90 show the pressure within first and second pumping chambers 40 and 50, respectively, during the pressure swing cycle.

Engineering refinements can be added to the piston motion, such as, a cam drive of the pistons and valves to provide slight pauses in the pistons during cycling, with a pause time to a particular valve shape and opening speed. These refinements further improve the efficiency, as would be recognized by one skilled in the art. Thus, changes can be made to the configuration of this invention, but the proper parameters for the gas separation process must take into account the critical timing interaction described.

The pressurization stage begins at a zero degree position of crank shafts 46 and 56 with second valve 20 open. Product gas acts to pressurize adsorbent bed 12 as second piston 52 moves downward in a compression stroke. The peak pressure is reached at approximately 140 degrees. Simultaneously, first piston 42 is rising upward in a compression stroke pressurizing the gas in first pumping chamber 40 while first valve 18 is closed. When the pressure is equal on both sides, first valve 18 opens. First piston 42 continues to its peak pressure at approximately 175 degrees, lagging second piston 52 by about 35 degrees. At this point, while both valves 18 and 20 are open, the gas mixture is shifted upward in adsorbent bed 12. Note that second piston 52 aids in the gas shift from about 110 degrees to about 180 degrees while it is moving in the same direction as first piston 42.

At approximately 190 degrees, second valve 20 closes and concentrated product gas is removed from adsorbent bed 12. At about 200 degrees in the cycle, first piston 42 is changing direction and the depressurization stage has begun. At approximately 340 degrees, first valve 18 closes and second valve 20 opens, flushing the gas mixture released from adsorbent bed 12. A new gas mixture is brought into the adsorbent bed 12 as first piston 42 rises, first valve 18 is closed and second valve 20 opens, beginning the pressure swing cycle again.

Figure 5:
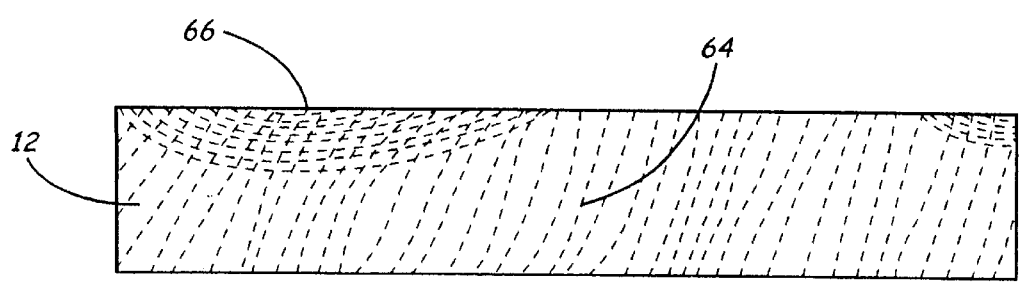
FIG. 5 is a diagram of product gas and gas mixture in an adsorbent bed during the pressure swing cycle.

FIG. 5 is a diagram of gas mixture 64 and product gas 66 in adsorbent bed 12 overtime. FIG. 5 is shown along the same time cycle as FIG. 4. Product gas 66 is indicated by the dense crosshatched area in the diagram. Gas mixture 64 is indicated by the lightly crosshatched area in the diagram, and may also contain the gas mixture without the product gas 66 moving in and out of the upper layers of adsorbent bed 12. The largest volume of product gas 66 is in the bed at around 110 degrees, when the pressure on the gas from second piston 52 is at its greatest. From approximately 200 degrees to approximately 360 degrees product gas 66 is extracted and has moved to second pumping chamber 50, as shown by lack of dark crosshatching during this period. At this time adsorbent bed 12 is depressurized and waste gas is moved into first pumping chamber 40.

The type of gas mixture and the adsorbent bed used must be taken into account as a variable when determining the design parameters. Another factor that has not been mentioned is the effect of the virtual volume created by the adsorbent bed. For example, when an adsorbent bed is selective for nitrogen this creates a volume effect that is three times the actual volume in the adsorbent bed for the selected adsorbed gas. The effect is slightly less than 2 for the product gas, which in this case would be oxygen. Also the effects of the reduced volume for the product gas after removal from the gas mixture must be accounted for in the design. The sizing of the piston displacement for the larger first piston 42 compensates for the former factors.

The present invention maximizes the ratio of product gas volume to energy loss, while minimizing the ratio of mechanical volume of the separator to the product gas volume. In particular, the desired ratios were determined by utilization of an adaptive computer program that manipulated five variables of a simulated machine as it operated.

The following steps were taken to minimize energy loss and to maximize product gas volume:

(1) Gas flow resistance was decreased by varying the width to length ratio of the adsorbent bed, as resistance parallel to flow varies as the cube of length.

(2) Energy losses were decreased in the pressurization/depressurization process by converting the potential energy of the compressed gas into usable kinetic energy to move the pistons.

(3) Valve losses of energy were decreased by opening the valves only when the pressure on opposite sides of the valves was equalized.

(4) Losses by temperature changes due to adsorption and desorption were decreased by reducing the size of the adsorption bed and by running rapid cycles (typically in the range of about 10 cycles per second) such that the average thermal change is approximately zero.

(5) The piston stroke volume was determined based upon the type of gas mixture and adsorbent bed used as well as the product gas volume produced.

Although the present invention has been described with reference to preferred embodiments, workers skilled in the art will recognize that changes may be made in form and detail without departing from the spirit and scope or the invention.

What is claimed is:

1. A method for operating an oxygen concentrator, the oxygen concentrator including an adsorbent bed having a separation chamber with first and second ports, a first pumping chamber connected to the first port with a first valve, a first piston in the first pumping chamber, a second pumping chamber connected to the second port with a second valve, and a second piston in the second pumping chamber, the method comprising:

closing the first valve;

opening the second valve;

moving the first piston toward the adsorbent bed;

moving the second piston toward the adsorbent bed;

opening the first valve;

moving the second piston away from the adsorbent bed;

closing the second valve; and moving the first piston away from the adsorbent bed.

2. The method of claim 1 wherein operation of the oxygen concentrator separates oxygen from ambient air.

3. The method of claim 2 wherein ambient air is introduced into the adsorbent bed from the first port and oxygen exits the adsorbent bed from the second port.

4. The method of claim 1, and further comprising:

compressing ambient air within the first pumping chamber with the first piston;

pumping oxygen into the adsorbent bed from the second pumping station with the second piston;

introducing ambient air into the adsorbent bed from the first pumping chamber; and withdrawing oxygen from the adsorbent bed into the second pumping chamber.

5. A method for separating oxygen from ambient air using an adsorbent bed having a feed end and a product end, the method comprising:

compressing ambient air at a feed end of the adsorbent bed wherein a first pressure is created outside of the adsorbent bed;

compressing oxygen into the adsorbent bed from the product end of the adsorbent bed wherein a second pressure is created within the adsorbent bed;

equalizing the first pressure and the second pressure such that the ambient air moves from the feed end into the adsorbent bed;

lowering the pressure within the adsorbent bed wherein the oxygen separates from the ambient air;

compressing ambient air into the adsorbent bed from the feed end to push the oxygen from the adsorbent bed through the product end into a product chamber connected to the adsorbent bed at the product end;

depressurizing the adsorbent bed; and withdrawing the oxygen from the product chamber.

6. The method of claim 5 wherein a feed chamber is connected at the feed end with a first piston disposed in the feed chamber and a first valve separating the feed chamber from the adsorbent bed to regulate the flow of ambient air with respect to the adsorbent bed, and a second piston is disposed in the product chamber with a second valve separating the product chamber from the adsorbent bed to regulate the flow of oxygen with respect to the adsorbent bed.

7. The method of claim 6 wherein the compressing ambient air step further comprises moving the first piston toward the adsorbent bed wherein the first valve is closed to create the first pressure outside the adsorbent bed.

8. The method of claim 6 wherein the compressing oxygen into the adsorbent bed step further comprises moving the second piston toward the adsorbent bed wherein the second valve is open to create the second pressure within the adsorbent bed.

9. The method of claim 6 wherein when the first and second pressures are equalized, the first valve opens thereby allowing ambient air to enter the adsorbent bed.

10. The method of claim 6 wherein the lowering the pressure within the adsorbent bed step further comprises moving the second piston away from the adsorbent bed.

11. The method of claim 6 wherein the compressing ambient air into the adsorbent bed step further comprises moving the first piston toward the adsorbent bed wherein the first valve is open and the second valve is open.

12. The method of claim 6 wherein the depressurizing step further comprises moving the first and second pistons away from the adsorbent bed.

13. The method of claim 6 wherein the withdrawing oxygen step further comprises moving the second piston away from the adsorbent bed wherein the second valve is closed.

14. An oxygen concentrator comprising:

an adsorbent bed including a separation chamber with first and second ports and a molecular sieve material contained in the separation chamber;

means for regulating the flow of ambient air with respect to the adsorbent bed;

means for regulating the flow of oxygen with respect to the adsorbent bed; and means for cycling the oxygen concentrator through a pressure swing cycle such that oxygen is separated from ambient air within the adsorbent bed.

15. The oxygen concentrator of claim 14 wherein the means for regulating the flow of ambient air comprises a first pumping station connected to the first port.

16. The oxygen concentrator of claim 15, and further comprising:

a first piston disposed in the first pumping station; and a first valve located between the first pumping station and the adsorbent bed.

17. The oxygen concentrator of claim 14 wherein the means for regulating the flow of oxygen comprises a second pumping station connected to the second port.

18. The oxygen concentrator of claim 17, and further comprising:

a second piston disposed in the second pumping station; and a second valve located between the second pumping station and the adsorbent bed.

19. The oxygen concentrator of claim 14 wherein the means for cycling the oxygen concentrator through a pressure swing cycle includes a drive system that coordinates operation of the means for regulating flow of ambient air and the means for regulating flow of oxygen.

20. A portable oxygen concentrator for separating oxygen from ambient air, the oxygen concentrator comprising:

an adsorbent bed including a separation chamber with feed end and a product end and a molecular sieve material contained in the separation chamber;

a first pumping station connected to the feed end to regulate flow of ambient air with respect to the adsorbent bed;

a second pumping station connected to the product end to regulate flow of oxygen with respect to the adsorbent bed;

a drive system to coordinate operation of the first pumping station and the second pumping station in a pressure swing cycle; and a battery operated power source.

21. The oxygen concentrator of claim 20 wherein the drive system operates the pressure swing cycle such that average thermal change is approximately zero.

22. The oxygen concentrator of claim 21 wherein the drive system runs about 10 cycles per second.

* * * * *